No. 653,130. Patented July 3, 1900.
P. BROWN.
LUBRICATING DEVICE FOR JOURNAL BOXES.
(Application filed Sept. 13, 1899.)
(No Model.) 2 Sheets—Sheet 1.
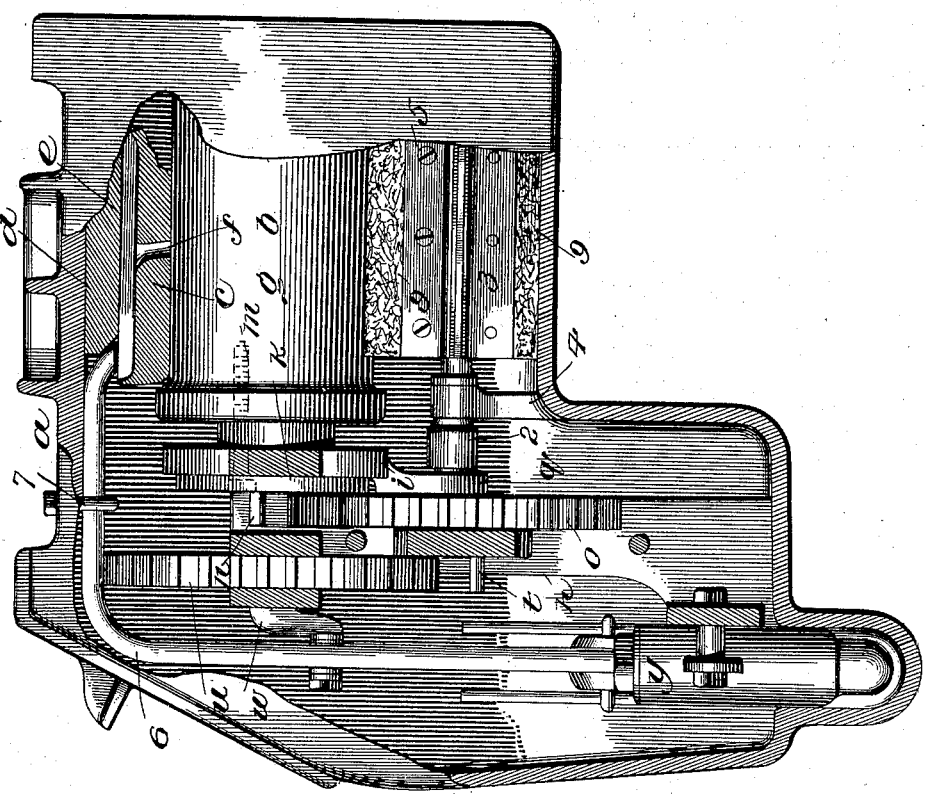

No. 653,130. Patented July 3, 1900.
P. BROWN.
LUBRICATING DEVICE FOR JOURNAL BOXES.
(Application filed Sept. 13, 1899.)
(No Model.) 2 Sheets—Sheet 2.
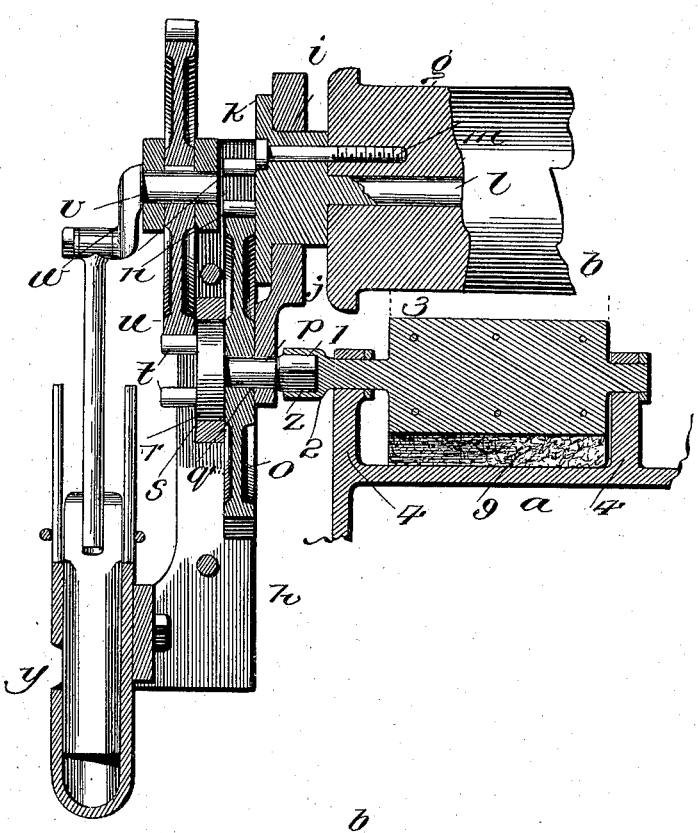
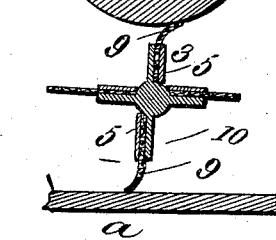
Witnesses
Inventor
Perry Brown
By T. J. W. Robertson
Attorney
THE NORRIS PETERS CO., PHOTO-LITHO., WASHINGTON, D. C.

UNITED STATES PATENT OFFICE.

PERRY BROWN, OF WILMINGTON, DELAWARE.

LUBRICATING DEVICE FOR JOURNAL-BOXES.

SPECIFICATION forming part of Letters Patent No. 653,130, dated July 3, 1900.

Application filed September 13, 1899. Serial No. 730,327. (No model.)

*To all whom it may concern:*

Be it known that I, PERRY BROWN, a citizen of the United States, residing at No. 1010 West Ninth street, Wilmington, in the county of New Castle and State of Delaware, have invented a certain new and useful Improvement in Lubricating Devices for Journal-Boxes, of which the following is a specification, reference being had to the accompanying drawings.

This improvement relates to that class of lubricators in which the lubricating material is fed to the axle by its motion when the car is running; and the invention consists in the peculiar construction hereinafter more particularly described and then definitely claimed at the end hereof.

In the accompanying drawings, Figure 1 is an elevation of a lubricating device constructed according to my invention and set in a railroad journal-box, with part thereof represented as broken away. Fig. 2 is a side view of the same. Fig. 3 is a vertical section through the gearing in line with the axis of the shafts. Fig. 4 is a cross-section through one of the lubricating means.

Referring now to the details of the drawings by letters, $a$ is the box proper, $b$ the axle, $c$ the "brass," and $d$ the wedge, all of which may be of any suitable form, but the brass should have a recess $e$ and duct $f$ to carry the lubricant to the journal $g$, which is supplied by means hereinafter described.

In the front of the box is a frame $h$, having a bearing $i$, in which is mounted a journal $j$, having a face-plate $k$ and stud $l$, which latter passes into the center of the axle $b$. To make the journal $j$ and face-plate $k$ turn with the axle, I set a screw $m$ through the face-plate and journal into the axle, so that the face-plate and journal move with the axle as one piece.

At $n$ are shown two (preferably steel) pins or teeth set in the end of the journal $j$ and which engage with the teeth of a gear-wheel $o$, mounted on a shaft $p$, running in a bearing $q$. One end of this shaft carries a face-plate $r$, which runs in a bearing $s$ and carries steel-pins $t$, engaging with the teeth of a wheel $u$, mounted on a shaft $v$, having a crank $w$, which operates the piston of a pump $y$.

The shaft $p$ also carries a square end $z$, fitting in a square socket 1 in a boss 2, formed on the end of a wiper 3, running in bearings 4, preferably cast on the bottom of the box, but may be made separate therefrom. This wiper carries wings or arms 10, in which is mounted felt 9, bristles, or other suitable material which will come in contact with the axle as the shaft revolves, thus wiping the axle with the oil in the lower part of the box. The felt or bristles may be held by plates 5, screwed to the wings.

Extending from the pump is a pipe 6, which carries up the oil or lubricating material into the recess $e$ in the brass, from whence it falls through the duct $f$ onto the top of the axle $b$. The pipe may be supported by a clip 7, passing through the top of the box.

It will be noticed that the frame $h$ is suspended from the journal $j$, which latter is connected to the axle and rotates therewith, and that although the bottom of the frame rests against the bottom of the box it is not connected thereto. By so suspending the frame from the axle the gearing is supported independently of the box and all the gearing moves and vibrates simultaneously instead of having part of the gearing rigidly connected to the box and part to the axle and vibrating against each other, as has heretofore been done. By this construction I am enabled to give a very slow motion to the pump and to the revolving wiper, whereby the difficulties heretofore encountered with this class of lubricating devices inherent to the fast speed with which they are usually driven is entirely overcome.

It will be seen that I have described and shown a pump provided with a pipe for conveying the lubricant to the axle and a wiper arranged under the axle, and that each of these devices is operated from the axle through reducing mechanism, so as to receive a very slow speed in comparison to the speed of said axle. In the following claims I refer to a "lubricant-applier," and by this generic term I mean to cover both the pump and the wiper. In other words, when I refer in my claims to a "lubricant-applier" and "gearing" for transmitting the motion of the axle to the lubricant-applier I mean to cover the said gearing in combination with the said pump or the said gearing in combination with the said wiper.

I do not in all cases use both forms of lubricator at once, as for most purposes one of them will be sufficient; but the use of both forms will be found advantageous in many instances, for should one of them break down the other one might still be found sufficient to supply the proper amount of lubricating material to the axle until the other one was set in working order.

What I claim as new is—

1. The combination in a journal-box, of a pump, an axle, a wiper arranged under the axle and intermediate gearing for giving the wiper and pump slower motions than the axle, substantially as described.

2. The combination with the journal-box and axle thereof, of a pump supported by said axle and arranged to deliver the lubricant over the axle, a wiper arranged under the axle, and a reducing mechanism between said axle and the pump and wiper and driving each of the latter at a slower speed than the axle, substantially as described.

3. The combination of a box, an axle working therein, a lubricant-applier, gearing for transmitting the motion of the axle to said lubricant-applier, and a non-rotatable frame hanging from the axle and supporting the gearing independently of the box, substantially as described.

4. The combination of a box, an axle working therein, a lubricant-applier receiving motion from said axle, a shaft supported by said axle and having teeth thereon, a non-rotatable frame hanging from said shaft, a gear-wheel supported by said frame and engaging the teeth carried by the aforesaid shaft, and means for transmitting the motion of said gear-wheel, substantially as described.

5. The combination in a journal-box, of an axle working therein, a pump, a frame set in the box and supported by the axle, a shaft set in said frame and connected to the axle at one end and carrying teeth at its other end, a gear-wheel engaging with the teeth on said shaft, means for transmitting the motion of said gear-wheel to the aforesaid pump, and a pipe for conducting the lubricant from said pump to said axle, substantially as described.

In testimony whereof I affix my signature, in the presence of two witnesses, this 8th day of September, 1899.

PERRY BROWN.

Witnesses:
   THOS. E. ROBERTSON,
   J. STEWART RICE.